US008316107B2

(12) United States Patent (10) Patent No.: US 8,316,107 B2
Wang et al. (45) Date of Patent: Nov. 20, 2012

(54) PERSONALIZING SPACE IN A NETWORK ENVIRONMENT

(75) Inventors: Jun Wang, Shanghai (CN); Guohong Xie, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 130 days.

(21) Appl. No.: 12/440,922

(22) PCT Filed: Sep. 11, 2006

(86) PCT No.: PCT/CN2006/002349
§ 371 (c)(1),
(2), (4) Date: Dec. 4, 2009

(87) PCT Pub. No.: WO2008/031273
PCT Pub. Date: Mar. 20, 2008

(65) Prior Publication Data
US 2011/0125872 A1 May 26, 2011

(51) Int. Cl.
*G06F 15/16* (2006.01)
(52) U.S. Cl. ........ 709/219; 709/217; 709/226; 711/100; 717/168; 717/174
(58) Field of Classification Search ............ 709/219, 709/226, 217; 711/100; 717/168, 174
See application file for complete search history.

(56) References Cited

U.S. PATENT DOCUMENTS

| 7,849,191 B2* | 12/2010 | Nose et al. ............ 709/226 |
| 2006/0143362 A1* | 6/2006 | Li et al. ............ 711/100 |
| 2006/0173975 A1 | 8/2006 | Nose et al. |
| 2008/0256532 A1 | 10/2008 | Xie et al. |

FOREIGN PATENT DOCUMENTS

| CN | 1498375 A | 5/2004 |
| CN | 1708753 A | 12/2005 |
| CN | 1797342 A | 7/2006 |
| JP | 11219311 A | 8/1999 |
| JP | 2005-165493 | 6/2005 |
| JP | 2005143584 A | 6/2005 |
| JP | 2006-209505 | 10/2006 |
| WO | WO-2008031273 A1 | 3/2008 |

OTHER PUBLICATIONS

Notice of Preliminary Rejection for Korean Patent Application No. 10-2009-7004980, Mailed Dec. 29, 2010, 11 pages.

(Continued)

*Primary Examiner* — Kyung H Shin
(74) *Attorney, Agent, or Firm* — Trop, Pruner & Hu, P.C.

(57) ABSTRACT

Machine-readable media, methods, apparatus and system are described. In an embodiment, a model client platform may generate a file image comprising an incremental file stored on a first model block of a model storage unit of the model client platform; generate a file description image comprising file description stored on a second model block of the model storage unit, wherein the file description comprises a position of the first model block in the model storage unit; and upload the file image and the file description image to a server connecting with the model client platform. An ordinary client platform may generate an ordinary block bitmap indicating usage status for each ordinary block of an ordinary storage unit of the ordinary client platform; and receive the file description image from the server connecting with the ordinary client platform.

24 Claims, 9 Drawing Sheets

OTHER PUBLICATIONS

Korean Intellectual Property Office, Notice of Preliminary Rejection mailed Dec. 29, 2010 in Korean application No. 10-2009-7004980.
Dong Cheng, Written Opinion of the International Searching Authority, Patent Cooperation Treaty, Jun. 28, 2007, 4 pages, PCT/CN2006/002349, International Searching Authority, Beijing, China.
Ellen Moyse, International Preliminary Report on Patentability, Patent Cooperation Treaty, Mar. 17, 2009, 5 pages, PCT/CN2006/002349, International Bureau of WIPO, Geneva, Switzerland.
State Intellectual Property Office, P.R. China, First Office Action issued Mar. 23, 2011 in Chinese application No. 200680055795.X.
Japanese Patent and Trademark Office, Office Action mailed Oct. 25, 2011, in Japanese application No. 2009-524063.
European Patent Office, Office Action dated Nov. 11, 2011 in European application No. 06 790 964.8-1527.
Korean Intellectual Property Office, Office Action mailed Nov. 30, 2011 in Korean application No. 10-2009-7004980.
Japanese Patent Office, Final Notice of Reasons for Rejection, mailed Feb. 14, 2012 in Japanese application No. 2009-524063.
Chinese Patent Office, Office Action mailed Mar. 16, 2012 in Chinese application No. 200680055795.X.

* cited by examiner

Storage unit 203

| B1 |  | ..... |  |  |
|----|--|-------|--|--|
|    |  | ..... |  |  |
|    |  | ..... |  | Bn |

FIG. 3A

Model Block bitmap 304

| 1 | 1 | 1 | 1 | 1 | . . . . . . . . | 1 | 0 | 1 |
|---|---|---|---|---|-----------------|---|---|---|
| B1 | B2 | B3 | B4 | B5 |              |   |   | Bn |

FIG. 3C

Incremental package 300

Incremental file image 301

| | Block content (file 1) | Block description info.(B4) |
|---|---|---|
| Entry 1 | Block content (file 1) | Block description info.(B5) |
| . . . | Block content (file 2) | Block description info. (10) |
| | . . . . . . . | . . . . . . . |

Incremental file description image 302

| | Block content (file description) | Block description info.(B20) |
|---|---|---|
| Entry 1' | Block content (file desription) | Block description info.(B21) |
| . . . . | Block content (file desription) | Block description info. (B30) |
| | . . . . . . . | . . . . . . . |

*FIG. 3B*

Ordinary block bitmap 303

| 1 | 1 | 1 | 0 | 0 | . . . . . . . . | 0 | 0 | 0 |
|---|---|---|---|---|---|---|---|---|
| B1 | B2 | B3 | B4 | B5 | | | | Bn |

PERSONALIZING SPACE IN A NETWORK ENVIRONMENT

CROSS-REFERENCE TO RELATED APPLICATION

This patent application is a U.S. National Phase application under 35 U.S.C. §371 of International Application No. PCT/CN2006/002349, filed on Sep. 11, 2006, entitled PERSONALIZING SPACE IN A NETWORK ENVIRONMENT.

BACKGROUND

The ability to personalize a computer is an important feature of a platform. In general, personalization involves changing the settings of a computer to suit a particular user. For example, a personal computer (PC) may be personalized by changing the background image, choosing text fonts, or a color scheme for the operating system. If the PC is shared by different users, an individual user may store these basic personal settings onto the PC into a user account. The settings may then be accessed at a later time by logging in.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for personalizing space in a network environment. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the current invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, that may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic storage unit storage media; optical storage media; flash memory devices; electrical, optical, acoustical or other forms of propagated signals (e.g., carrier waves, infrared signals, digital signals, etc.) and others.

Figure 1:
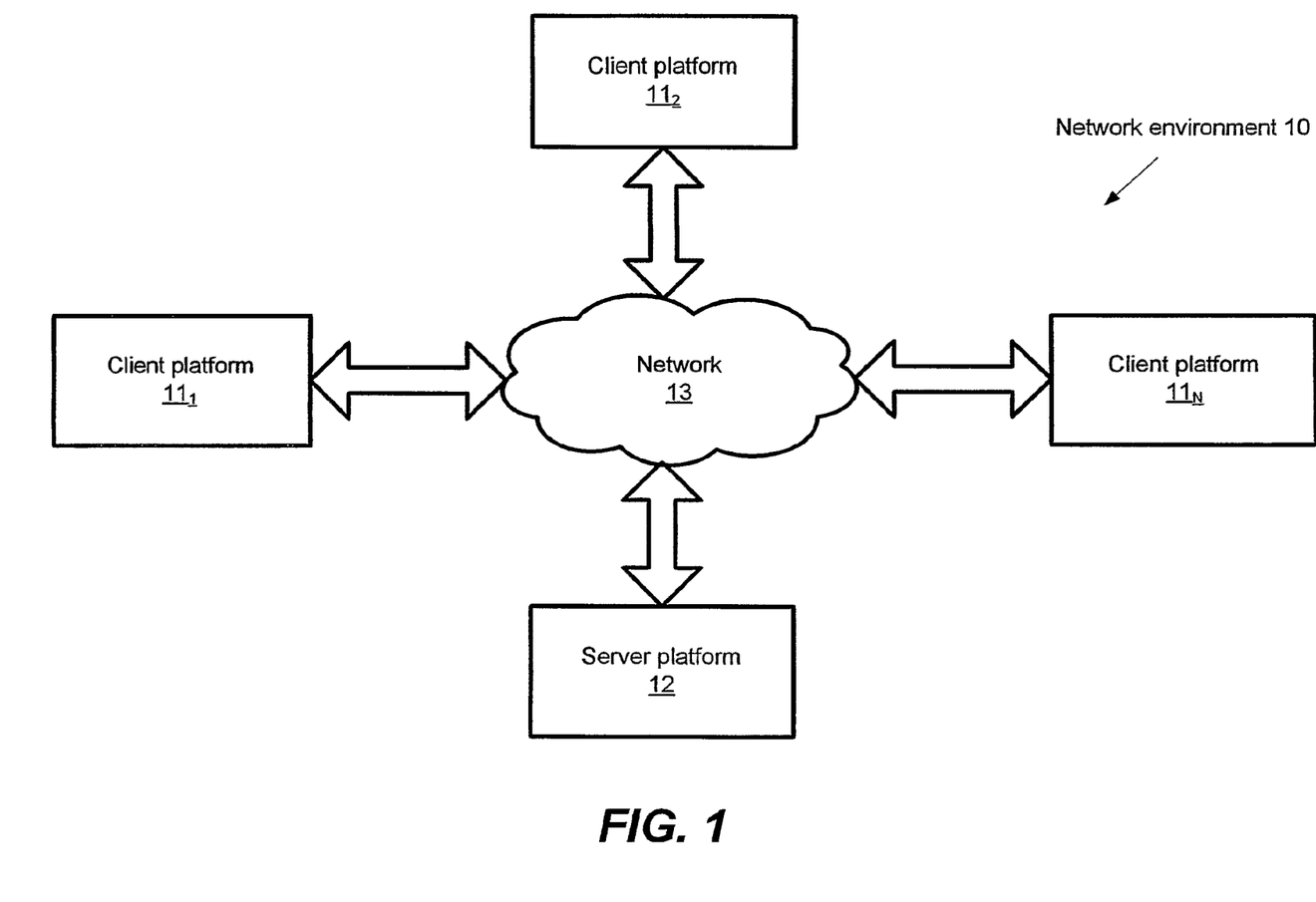
FIG. 1 shows an embodiment of a network environment comprising a server platform and a plurality of client platforms connecting with the server platform.

An embodiment of a network environment 10 is depicted in FIG. 1. The network environment 10 may comprise a server platform 12 and a plurality of client platform $11_1$-$11_N$ connecting with the server platform 12 through a network 13, such as Ethernet, fiber channel or other like communications link. In the embodiment, network environment 10 may comprise any number of client platforms and server platforms.

Network environment 10 may provide different content to different groups of clients in order to meet their personalized requirements. For example, young students may require educational content while adults may prefer entertainment content. To meet these needs, each of client platforms $11_1$-$11_N$ may be installed with base software images, such as an operating system and/or base software applications running above the operating system and/or possibly other software images.

One of the client platforms (e.g., client platform $11_1$) may be selected as a model client platform to be installed with incremental software images that may be different from the base file. For example, the incremental file may comprise programs (e.g., educational content) that may provide personalized services to a particular group of clients (e.g., young students). For another example, the incremental file may be an updated version of the base file. The model client platform may then generate an incremental package comprising the incremental software images and their description information, which is uploaded to the server. The incremental package may further comprise block description to describe the blocks storing the incremental software images. In one embodiment, the block description may comprise position of the blocks in the storage unit of the model platform.

The model client platform may further generate information indicating whether the incremental software images stored in the blocks of the storage unit are available from the server, and upload the information to server 12. In one embodiment, the information may be a model block bitmap indicating usage status of each block of a storage unit of the model client platform.

The above configuration may enable an ordinary client platform (e.g., client platform 11₂) in network environment 10, which may not have been installed with the incremental software images beforehand, to provide a client of the group with personalized contents by downloading the incremental software images from the server upon request from the client.

Figure 2:
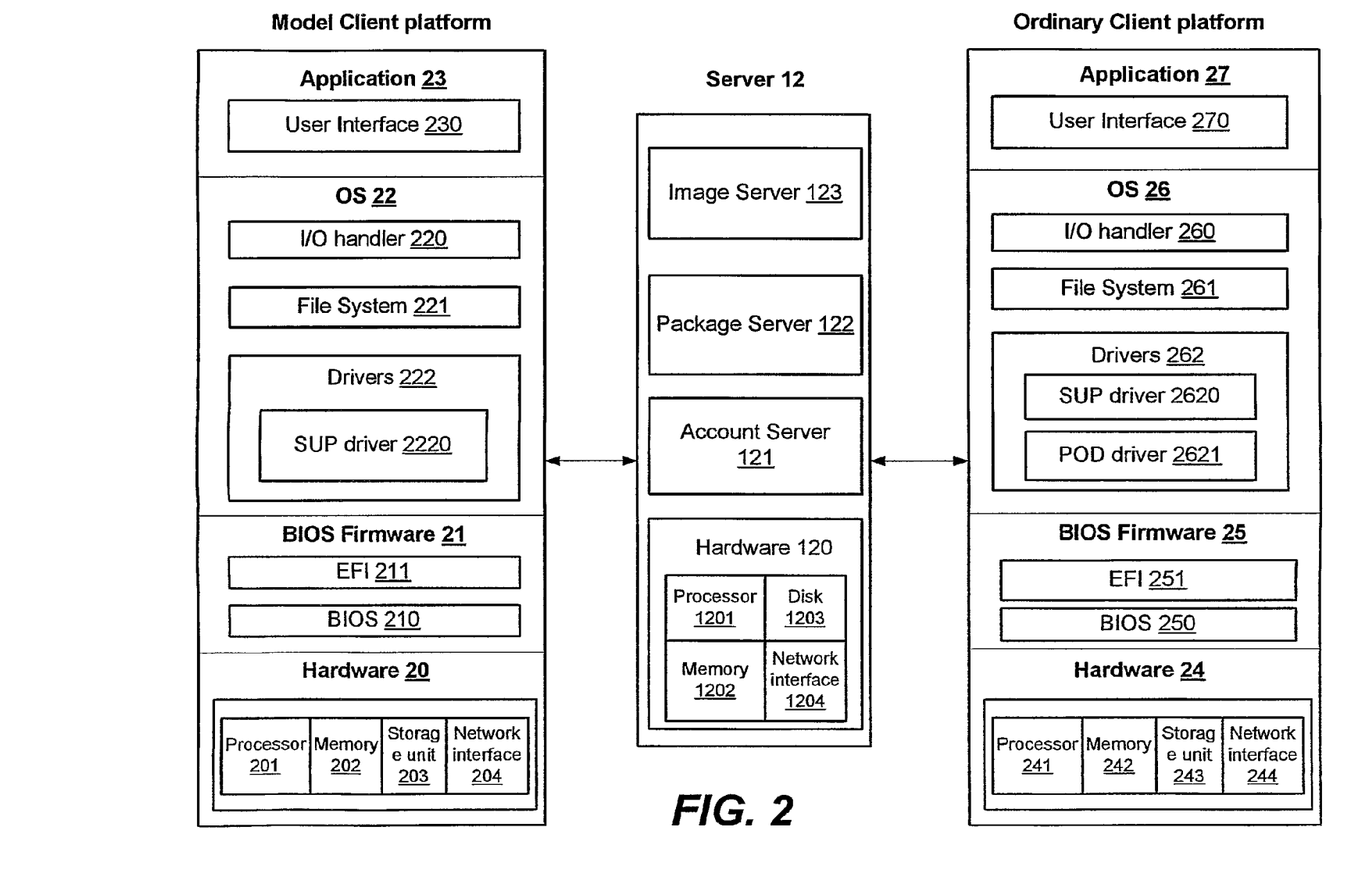
FIG. 2 shows an embodiment of structures of an ordinary client platform, a model client platform and a server platform in the network environment.

An embodiment of structures of a model client platform (e.g., client platform 11₁), an ordinary client platform (e.g., client platform 11₂) and a server platform 12 in network environment 10 is depicted in FIG. 2.

As depicted, the model client platform (e.g., client platform 11₁) may comprise a hardware machine 20, a firmware 21 running over the hardware machine 20, and software images running over the firmware 21 including an operating system 22 and applications 23.

Hardware machine 20 may further comprise one or more processor 201, a memory 202, a storage unit 203, and a network interface 204, etc. Storage unit 203 may comprise an internal storage unit (e.g., hard disk) residing inside of the client platform and an external storage unit (e.g., floppy disk, optical disk, etc.) residing outside of the client platform. In the embodiment, the storage unit 203 may be divided into a plurality of blocks for data storage.

Firmware 21 may store basic input output system (BIOS) routines 210 that the platform executes during system startup and extended firmware interface (EFI) routines 211 to interface between firmware 21 and operating system 22 and provide a standard environment for booting operating system 22. Operating system 22 may control tasks that the client platform carries out and manages system resources to optimize performance. Operating system 22 may perform basic tasks, such as keeping track of files and dictionaries on storage unit 203.

In the embodiment, there may be two kinds of files: base files and incremental files. Base files may comprise programs for operating system 22 and/or programs for basic applications such as database programs, word processor, spreadsheets. Incremental files may comprise files different from base files. For example, the incremental files may comprise programs designed for a group of clients such as educational programs for the young students or games for adults. Operating system 22 may comprise a I/O handler 220 to receive calls from application 23 to write or read a file to or from storage unit 203, a file system 221 to organize and keep track of the files on storage unit 203 and drivers 222 to input/output the files from/to storage unit 203. Drivers 222 may further comprise a storage unit protection (SUP) driver 2220 to prevent base files on the storage unit from being destroyed.

The application 23 may run in a software platform provided by the operating system 22 and may comprise software programs to provide a user interface 230 for user interactions.

The ordinary client platform (e.g., client platform 11₂) may comprise a hardware machine 24, a firmware 25 running over the hardware machine 24, and software images running over the firmware 25 including an operating system 26 and applications 27.

Configuration of the ordinary client platform is similar with that of the model client platform, except that operating system 26 of the ordinary client platform may further comprise a provisioning on-demand (POD) driver 2621 to retrieve files from storage unit 243 or server 12 upon demanded by the client.

Server 12 may comprise a hardware machine 120, an account server 121, package server 122 and image server 123. The hardware machine 120 may comprise one or more processors 1201, memory 1202, storage unit 1203, network interface 1204, etc. The account server 121 may verify account information received from the client platform. Package server 122 may receive/transmit incremental packages from/to the client platform based upon verification result from the account server 121.

In order to provide personalized services to a group of the clients, the base files including the operating system and/or base applications may be pre-installed on the storage unit of each client platform during the pre-installation period. However, the base file may be installed in other ways. For example, the base files may be pre-installed in storage unit 203 of the model client platform. EFI 221 of the model client platform may then generate a base package including the base files and base file descriptions (such as file name, file size and file organization), and upload the base package to image server 123 of server 12.

The base package may further comprise block descriptions to describe the blocks storing the base files, such as positions of the blocks in storage unit 203 of the model client platform. Image server 123 may then download the base package to each of other client platforms during the pre-installation period, so that each of the other client platforms may pre-install the base files on the same positions of blocks as the model client platform.

The incremental files designed for a group of clients, such as educational materials or games, may be installed on storage unit 203 of the model client platform. During the installation, SUP driver 2220 may direct the incremental files into the blocks of storage unit 203 not used by the base files in order to prevent the base files from being destroyed. SUP driver 2220 may further determine if an incremental file is an updated version of a base file and record mapping information indicating the blocks storing the incremental file maps with the blocks storing the base file if the incremental file is the updated base file.

EFI 211 may then generate an incremental package based upon the incremental files and available mapping information. The incremental package may then be uploaded to the server. The package may comprise an incremental file image having content of the incremental files and an incremental file description image having file description for the incremental files. Examples of the file description may comprise file name, file size and file organization (e.g., tree structure of the file system). In the embodiment, the file description may further comprise information for the blocks of storage unit 203 that may store the incremental file, such as block position in storage unit 203. EFI 211 may further generate a model block bitmap indicating usage status of each block of storage unit 203 and upload the model block bitmap to server 12.

Figure 3A:
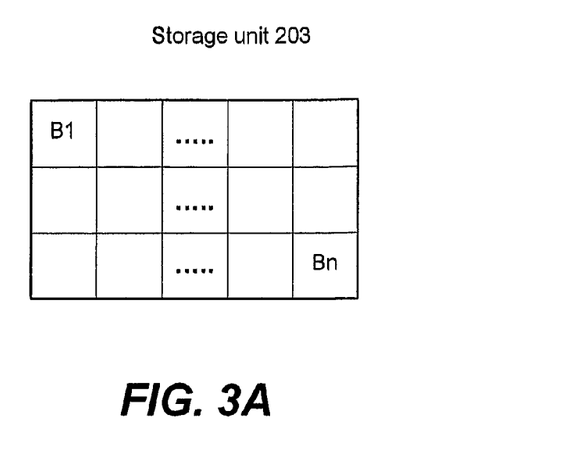
FIG. 3A shows an embodiment of a storage unit divided into a plurality of blocks.

FIG. 3A shows an embodiment of storage unit 203 that has been divided into the plurality of blocks, for example, block 1 . . . block n.

Figure 3B:
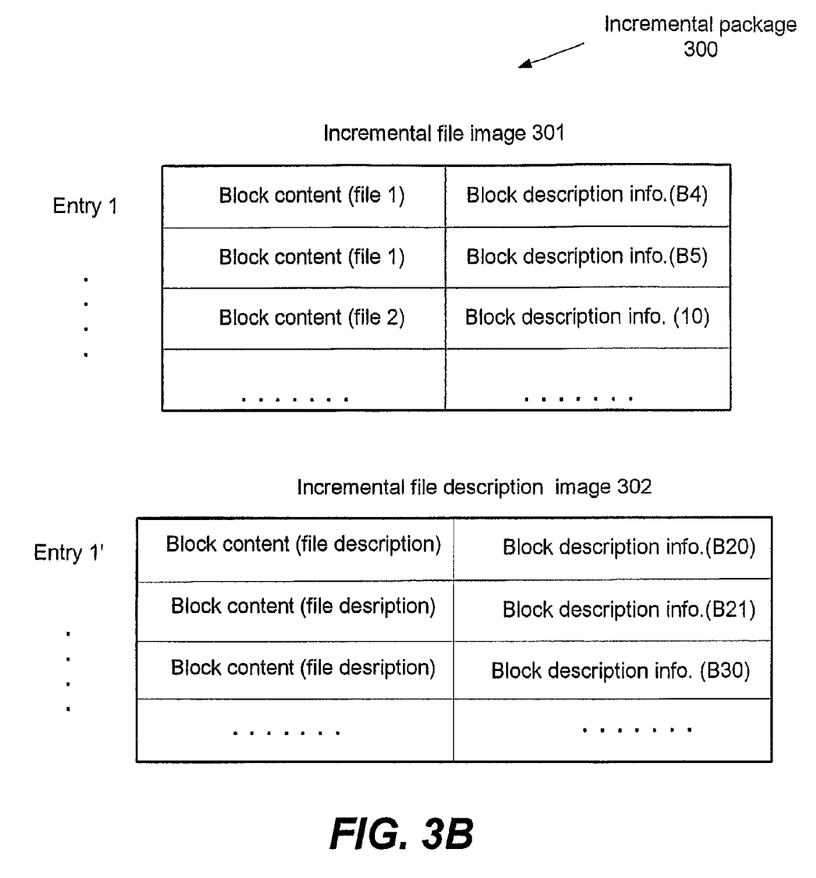
FIG. 3B shows an embodiment of an incremental file image and an incremental file description image.

FIG. 3B shows an embodiment of the incremental package 300 having an incremental file image 301 and an incremental file description image 302. Incremental file image 301 may comprise a plurality of entries, each of which correspond to a block of storage unit 203. Each entry of incremental file image 301 may comprise two parts, one for content of the incremental file stored in the block and the other for description information related to the block.

For example, entry 1 of incremental file image 301 may comprise the content of incremental file 1 stored in block 1 of storage unit 203 and description information related to block 1 (e.g., block position in storage unit 203). For an incremental file that may need more than one block for storage, its corresponding incremental file image may comprise more than one entry.

Similarly, incremental file description image 302 may comprise a plurality of entries, each of which correspond to a block of storage unit 203. Each entry of incremental file description image 302 may comprise two parts, one for file description information stored in a block and the other for description information related to the block.

For example, entry 1' of incremental file description image 302 may comprise the file description information stored in block 20 of storage unit 203 and the block description information related to block 20 (e.g., block position in the storage unit 203). As stated above, the file description information may comprise description information related to the incremental files (e.g., incremental files 1 and 2), such as file name, file size, file organization, and blocks of storage unit 203 that store the incremental files (e.g., blocks 4, 5 and 10 that store incremental files 1 and 2)

Figure 3C:
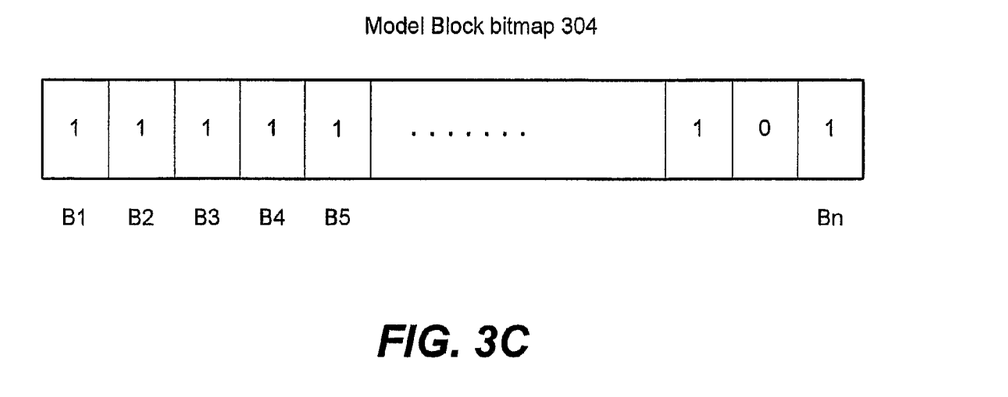
FIG. 3C shows an embodiment of a model block bitmap generated by the model client platform.

FIG. 3C shows an embodiment of the model block bitmap, wherein each bit of the bitmap may correspond to each block of the storage unit 203, and bit '1' or bit '0' may represent the corresponding block has been used and vice versa. However, it should be appreciated that other technologies may be applied for the model block bitmap. For example, the model block bitmap may indicate whether contents stored on each block of the storage unit 203 have been uploaded to the server. In such case, bit '1' or bit '0' may represent the content of the corresponding block has been uploaded, and vice versa.

Referring back to FIG. 2, when a client of the group (e.g., a young student) logs on the ordinary client platform which has been pre-installed with the base files, EFI 251 may receive account information input by the client through user interface 270. The account information may then be sent to account server 121 for verification during initializing the platform and prior to booting the operating system 26.

After verification, account server 121 may trigger package server 122 to send the model block bitmap matching the account information to EFI 251. The model block bitmap may be provided by EFI 211 of the model client platform indicating usage status of each block of storage unit 203 of the model client platform. EFI 251 may further generate an ordinary block bitmap indicating usage status of each block of storage unit 243 of the ordinary client platform.

Figure 3D:
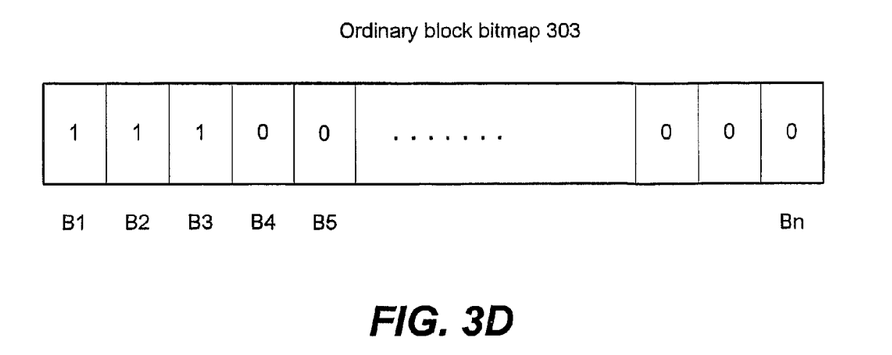
FIG. 3D shows an embodiment of an ordinary block bitmap generated by the ordinary client platform.

FIG. 3D shows an embodiment of ordinary block bitmap 304. As shown, blocks 1-3 of storage unit 243 may be used to store base files when pre-installing the ordinary client platform.

After operating system 26 is booted up in the ordinary client platform and drivers 262, including SUP driver 2620 and POD driver 2621, are setup, package server 121 may send the POD driver 2621 with an incremental file description image designed for the client. POD driver 2621 may retrieve the file description information and block description information from the incremental file description image. POD driver 2621 may also store the file description information on the block positions described in the block description information and update the ordinary block bitmap retrieved from EFI 251. The ordinary block bitmap may be updated by indicating that the blocks of storage unit 243 storing the incremental file description information are used.

By utilizing the incremental file description information retrieved from server 12 and other information (e.g., base file description information), operating system 26 may build up file system 261 presenting a file organization. In the embodiment, file system 261 may further present information related to the blocks corresponding to the files, especially, the incremental files. File system 261 may help operating system 26 to present icons of the incremental files and/or base files on a screen of user interface 270, even though the content of the incremental files has not been installed onto storage unit 243 of the ordinary platform. For example, user screen 270 may present e-class icons to the young students or game icons to the adults.

When the client opens a file by clicking the file icon on user interface 270, I/O handler 260 may receive the I/O call from user interface 270 and file system 261 may analyze which blocks of storage unit 243 may correspond to the selected file. POD driver 2621 may determine whether the selected file is stored in storage unit 243 by referring to the ordinary block bitmap. If the ordinary block bitmap indicates the corresponding blocks are used, POD driver 2621 may retrieve the file from the blocks of storage unit 243 and output the file to user interface 270. However, if the ordinary block bitmap indicates the corresponding blocks are unused, POD driver 2621 may determine whether the selected file are available from server 12 by referring to the model block bitmap. For example, that the corresponding blocks are indicated as used in the model block bitmap may represent that the selected file is available from the server.

In response to determining that the selected file is available from server 12, POD driver 2621 may send a request of downloading the selected file to server 12. Package server 122 may retrieve entries of the incremental file image that store the selected file and download the incremental file image entries to POD driver 2621 so that POD driver 2621 may store the file retrieved from the incremental file image entries to the corresponding blocks of storage unit 243 and update the ordinary block bitmap by indicating the corresponding blocks are used. Finally, the POD driver 2621 may output the selected file to user interface 270.

When the client selects to download a new file onto storage unit 243, the SUP driver 2620 may store the new file onto the blocks of storage unit 243 not used by the base files in order to protect the base files. SUP driver 2620 may further determine whether the new file is an updated version of a base file. If the new file is the updated base file, SUP driver 2620 may record mapping information to map the blocks storing the new file with the blocks storing the base file.

If the client decides to save a current storage unit configuration before leaving, the ordinary client platform may reboot and EFI 251 may generate an incremental package based upon the incremental files stored on storage unit 243 of the ordinary client platform and/or the mapping information, and upload the incremental package to server 12. EFI 251 may further upload the ordinary block bitmap to the server, so that when the client logs on another ordinary client platform, the ordinary block bitmap and incremental package downloaded from server 12 may be used to generate the same storage unit environment.

Other embodiments may implement other technologies for the structures as shown in FIG. 2. For example, the model platform may be further used to install incremental files designed for other groups of clients. In such circumstances, EFI 211 may generate respective incremental packages and block bitmaps for respective group of clients. In another example, EFI 211 may not upload incremental file description images to server 12 if the corresponding file description has been pre-installed into the ordinary client platform. In still another example, the model block bitmap may be omitted and information related to the blocks storing the incremental files may be integrated with the incremental file description images, such as an indicator to indicate whether the incremental file stored on the corresponding blocks is available from server 12.

Figure 4:
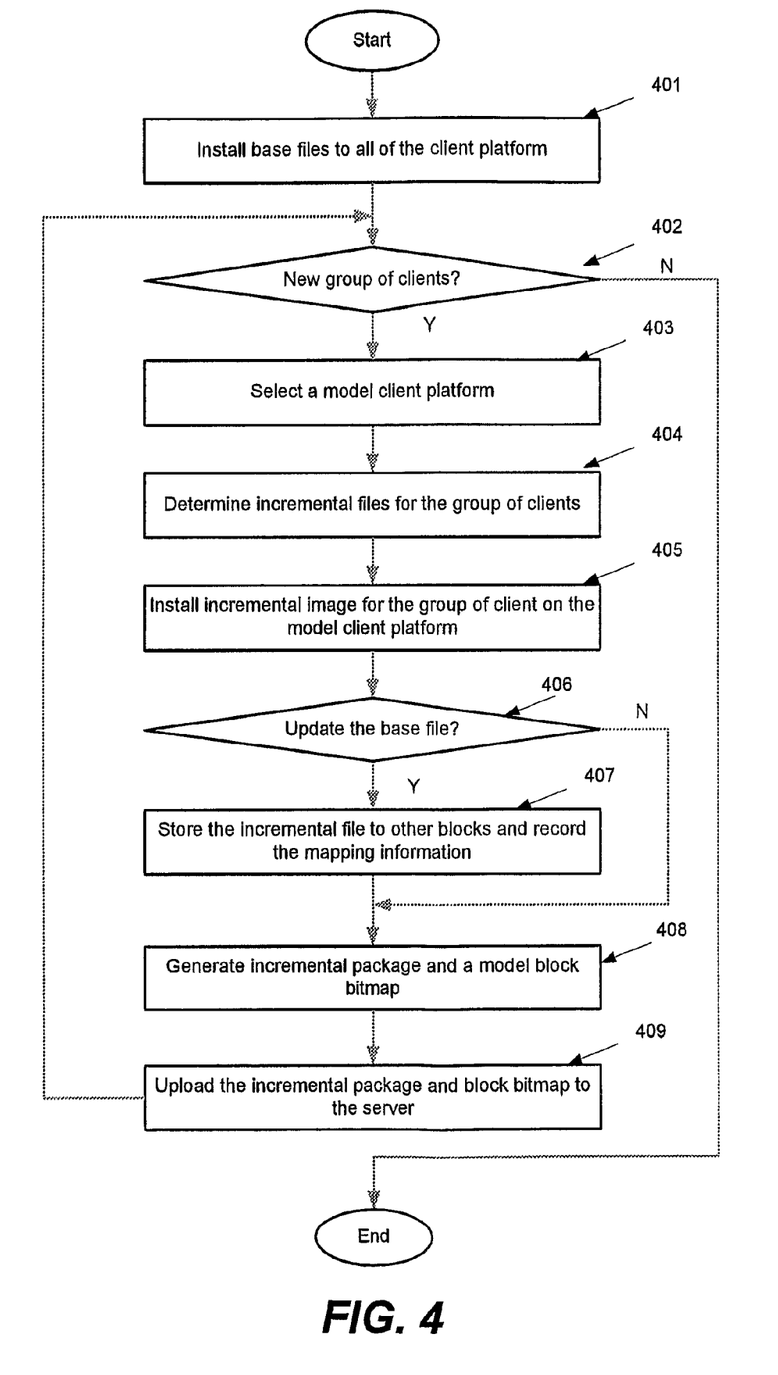
FIG. 4 shows an embodiment of a method of installing the model client platform.

FIG. 4 depicts an embodiment of a method of installing the model client platform. As depicted, an IT administrator or a suitable device may install base files on one or more of client platform $11_1$-$11_N$ in block 401, wherein the base files may comprise an operating system and/or any base application files.

In block 402, the IT administrator or a suitable device may determine whether to install incremental files designed for a new group of clients on a model client platform. If so, the IT administrator or a suitable device may select a client platform from network environment 10 as the model client platform in block 403, determine the incremental files designed for the group of clients in block 404 and install the incremental files on the storage unit of the selected model client platform in block 405.

While installing the incremental files, SUP driver 2220 of the model client platform may determine whether an incremental file is an updated version of a base file that has been installed in the storage unit of the model client platform in block 406. In response to determining that the incremental file is the updated base file, the SUP driver may store the incremental file to blocks unused by the base files and map the blocks storing the incremental file with the blocks storing the base file in block 407. Then, in block 408, EFI 211 may generate an incremental package comprising the incremental file images and the incremental file description images, and a model block bitmap indicating usage status of the blocks of storage unit 203 of the model client platform. Finally, EFI 211 or other suitable device of the model client platform may upload the incremental package and model block bitmap to server 12 in block 409.

Figure 5:
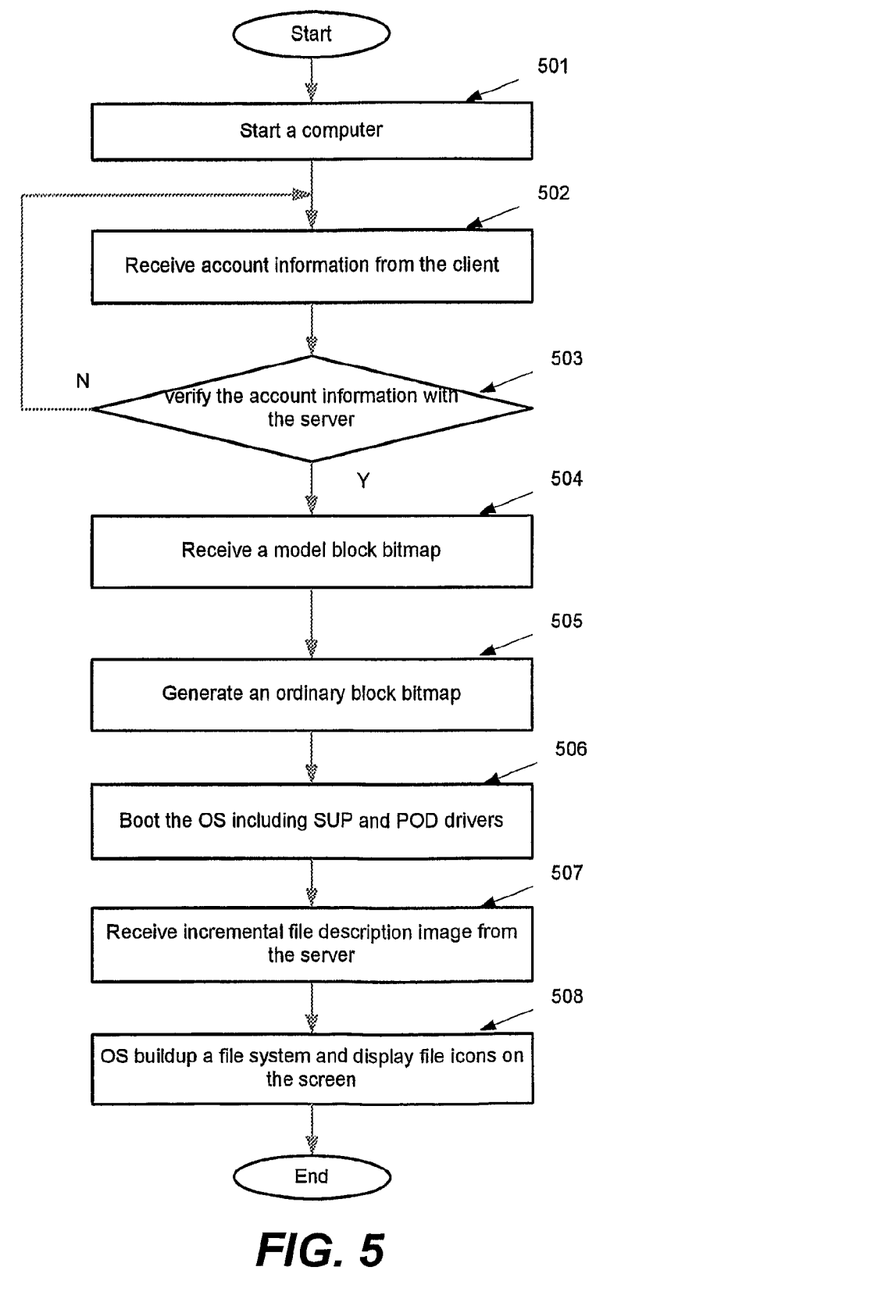
FIG. 5 shows an embodiment of initializing the ordinary client platform.

FIG. 5 shows an embodiment of initializing the ordinary client platform. In block 501, the ordinary client platform is started and firmware routines may execute BIOS programs before booting the operating system. In block 502, EFI 251 may prompt the client to input account information through user interface 270. Then, in block 503, EFI 251 may send the account information to server 12 so that account server 121 may verify the account information in block 503. Upon verification, package server 122 may send EFI 251 with a model block bitmap matching with the account information in block 504. The model block bitmap may be generated by the model client platform installed with incremental files designed for the client.

In block 505, EFI 251 may generate an ordinary block bitmap indicating usage status of blocks of storage unit 243 of the ordinary client platform. Then, in block 506, operating system 26 is booted and drivers including SUP driver 2620 and POD driver 2621 are setup. In block 507, package server 122 may send POD driver 2621 with the incremental file description image uploaded by the model client platform, wherein the incremental file description image may contain description information related to the incremental files and block description related to the blocks storing the incremental file in the model platform.

Then, in block 508, operating system 26 of the ordinary client platform may setup a file system by utilizing the incremental file description image and present icons of the incremental files on user interface 270 even through the incremental files may not be in fact loaded on the ordinary client platform.

Figure 6:
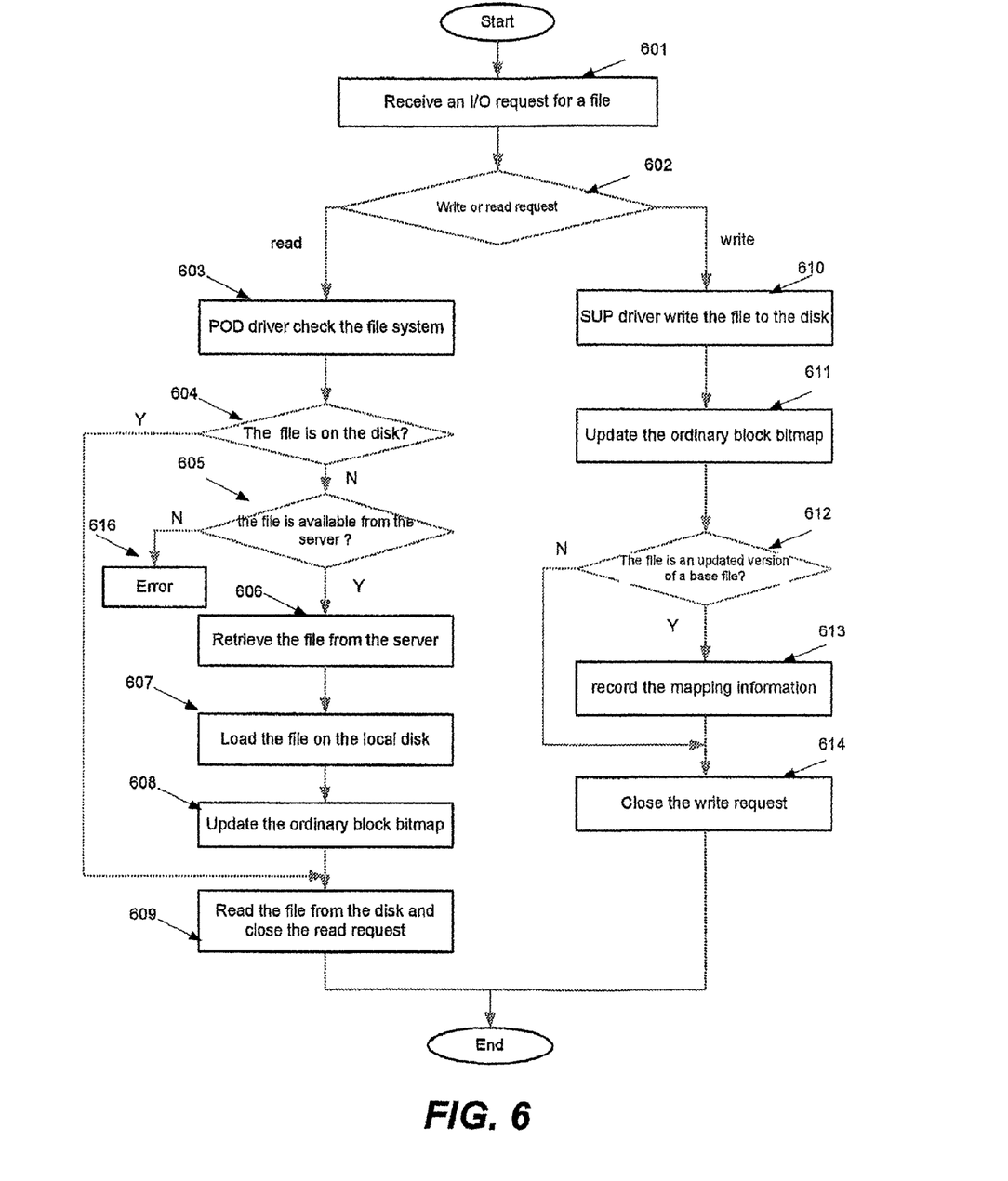
FIG. 6 shows an embodiment of handling an input/output request in the ordinary client platform.

FIG. 6 shows an embodiment of handling an input/output request with the ordinary client platform. In block 601, I/O handler 260 of the ordinary client platform may receive an I/O request to read or write a file from or to storage unit 243. In block 602, I/O handler 260 may determine whether the request is a read request or a write request. For a read request, I/O handler 260 may transfer the request to POD driver 2621. Then, in block 603, POD driver 2621 may check the required file with file system 261 to find file related information, such as information related to the blocks storing the file.

In block 604, POD driver 2621 may determine whether the required file is already loaded on the blocks of storage unit 243 by referring to the ordinary block bitmap retrieved from EFI 251. If the file is loaded on the blocks of storage unit 243, POD driver 2621 may read and output the file from the storage unit 243 to the user interface 270 and close the I/O request. If the file is not loaded on the blocks of storage unit 243, POD driver 2621 may determine whether the required file is available from server 12 by referring to the model block bitmap.

In response to determining that the required file is available from server 12, POD driver 2621 may send a file image download request to server 12 and package server 122 may find entries of the incremental file image having the required file and send the incremental file image entries to POD driver 2621. Then, the POD driver 2621 may retrieve the file from the incremental file image entries in block 606 and load the file to the corresponding blocks of storage unit 243 in block 607. In block 608, POD driver 2621 may update the ordinary block bitmap by indicating the blocks storing the required file are used. In block 609, POD driver 2621 may output the file to user interface 270 and close the I/O request.

In response to determining that the I/O request is a request of writing a new file onto storage unit 243 in block 602, I/O handler 260 may transfer the request to SUP driver 2620. Then, in block 610, SUP driver 2620 may store the new file onto the blocks of storage unit 243 not used by the base files. In bock 611, SUP driver 2620 may update the ordinary block bitmap by indicating the blocks for storing the new file are used. In block 612, SUP driver 2620 may further determine whether the new file is an updated version of a base file stored on storage unit 243. If so, SUP driver 2620 may record mapping information to map the blocks storing the new file with the blocks storing the base file in block 613.

Figure 7:
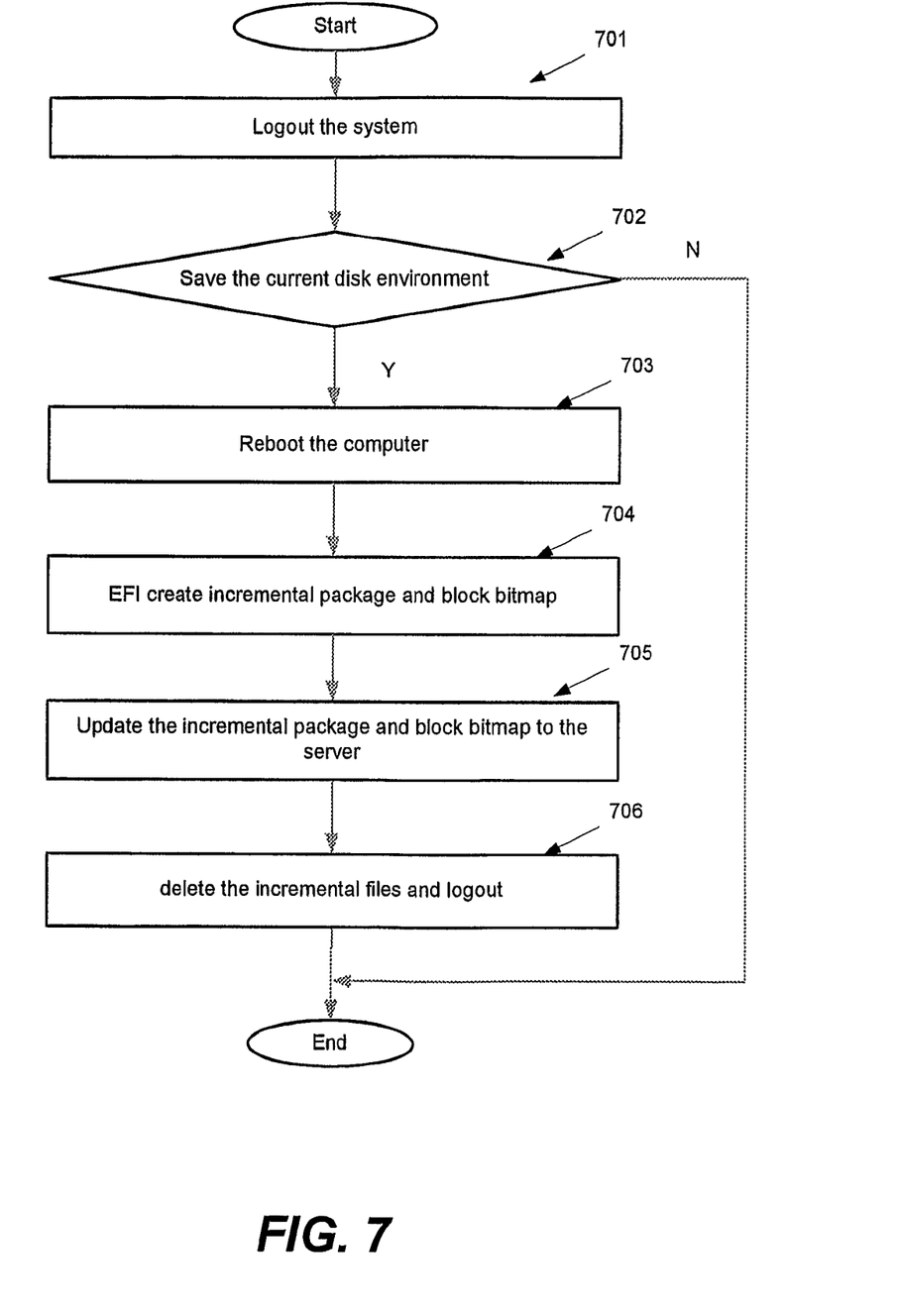
FIG. 7 shows an embodiment of saving a storage unit space for a client of the client platform in the network environment.

FIG. 7 shows an embodiment of saving a storage unit space for a client of the client platform in the network environment. In block 701, the client may logout of the client platform and be given the option of saving the current storage unit environment. To save the environment, the client platform may reboot the platform in 703, and EFI 251 or other suitable device of the client platform may create an incremental package and a block bitmap. The incremental package may comprise incremental file images corresponding to the incremental files stored on the storage unit and incremental file description images having description information related to the incremental files. The block bitmap may indicate usage status of blocks of the storage unit. As stated above, the block bitmap may be omitted and such information related to the blocks may integrated into the incremental file description images.

Then, in block 705, EFI 251 may upload the incremental package and block bitmap to server 12. In block 706, EFI 251 may erase the incremental files from the storage unit of the client platform and logout.

Other embodiments may implement other technologies for the method depicted in FIG. 7. For example, the client platform may determine whether the client is a VIP client before providing the storage unit environment save/restore service, assuming that only VIP client may be entitled to such services.

Figure 8:
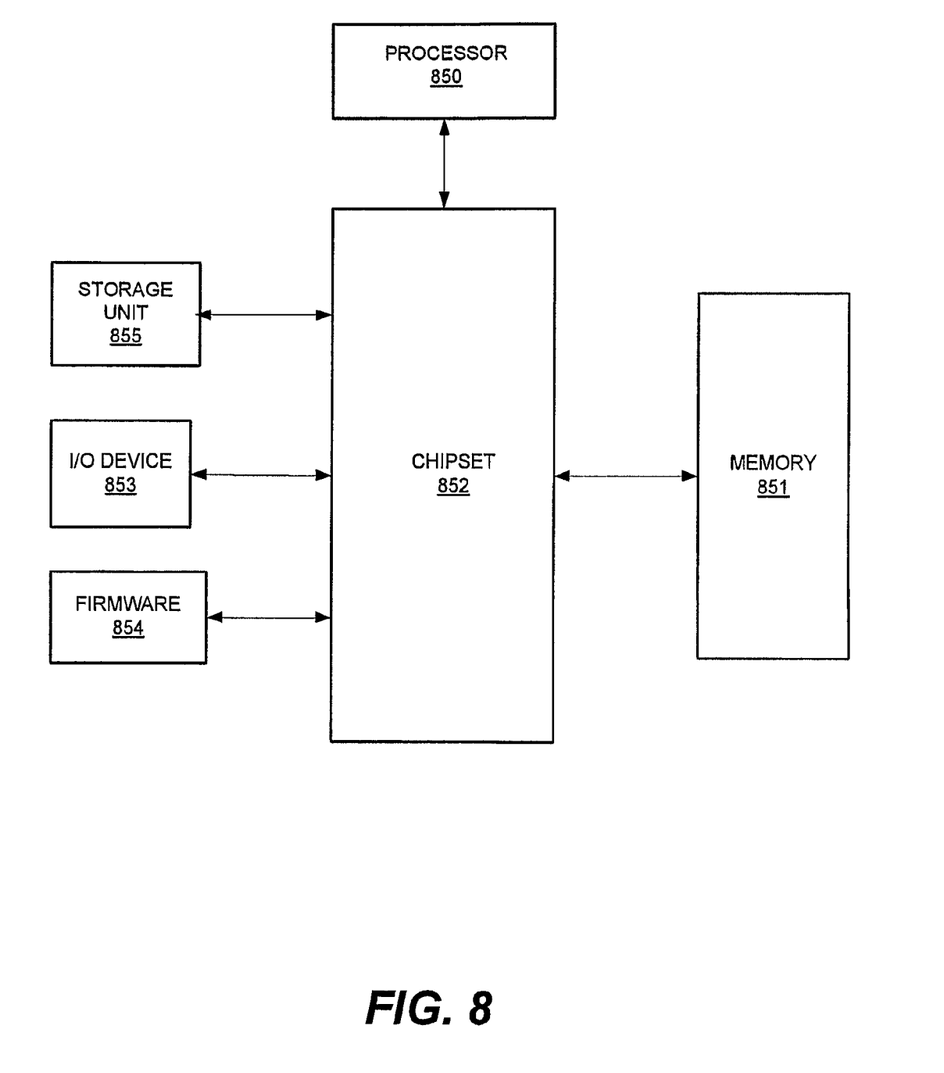
FIG. 8 shows an embodiment of a general platform.

FIG. 8 depicts an embodiment of a general platform that may act as a client platform or server in the network environment 10 of FIG. 1. The platform may comprise one or more processors 850, memory 851, chipset 852, I/O device 853, firmware 854, and storage unit 855. The processors 850 are communicatively coupled to the other components via one or more buses such as a processor bus. The processors 850 may be implemented as an integrated circuit (IC) with one or more processing cores that may execute codes under a suitable architecture, for example, including Intel® Xeon™, Intel® Pentium™, Intel® Itanium™ architectures, available from Intel Corporation of Santa Clara, Calif.

In an embodiment, the memory 851 may store codes to be executed by the processor 850. A non-exhaustive list of examples for the memory 851 may comprise one or a combination of the following semiconductor devices, such as synchronous dynamic random access memory (SDRAM) devices, RAMBUS dynamic random access memory (RDRAM) devices, double data rate (DDR) memory devices, static random access memory (SRAM), and flash memory devices.

In an embodiment, the chipset 852 may provide one or more communicative path among the processor 850, memory 851 and various components, such as the I/O device 853, firmware 854 and storage unit 855. Examples for the I/O devices 853 may comprise a keyboard, mouse, network interface, a storage device, a camera, a blue-tooth, and an antenna.

The firmware 854 may store BIOS routines that the platform executes during system startup in order to initialize the processors 850, chipset 852, and other components of the platform and/or EFI routines to interface the firmware 1054 with an operating system of the platform and provide a standard environment for booting the operating system.

The storage unit 855 may comprise an internal storage unit (e.g., hard disk) residing inside of the platform and/or an external storage unit (e.g., floppy disk, optical disk, etc.) residing outside of the client platform. When the platform as depicted in FIG. 8 may perform as the client platform, the storage unit 855 may store base files, incremental files, file description or possibly other data. When the platform as depicted in FIG. 8 may perform as server 12, the storage unit 855 may store incremental file images, incremental file description images, block bitmap or possibly other data.

While certain features of the invention have been described with reference to example embodiments, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising:
generating a file image comprising an incremental file stored on a first model block of a model storage unit of a model client platform;
generating a file description image comprising a file description stored on a second model block of the model storage unit, wherein the file description comprises a position of the first model block in the model storage unit;
generating a model block bitmap indicating whether data stored on each model block of the model storage unit is available from a server coupled to the model client platform; and
uploading the file image and the file description image to the server, wherein the file description image is usable by an ordinary client platform coupled to the server to present an icon of the incremental file on a user interface of the ordinary client platform when the incremental file is not loaded on the ordinary client platform.

2. The method of claim 1, further comprising generating the model block bitmap indicating usage status of each model block of the model storage unit.

3. The method of claim 1, wherein the file image further comprises the position of the first model block in the model storage unit.

4. The method of claim 1, wherein the file description image further comprises a position of the second model block in the model storage unit.

5. The method of claim 1, further comprising:
generating another file image comprising a base file stored on a third model block of the model storage unit and a position of the third model block in the model storage unit; and
uploading the another file image to the server.

6. The method of claim 1, further comprising:
determining the incremental file is an updated version of a base file stored on a third model block of the model storage unit;
recording mapping information to map the first model block storing the incremental file with the third model block storing the base file; and
uploading the mapping information to the server.

7. A method comprising:
generating an ordinary block bitmap indicating usage status of each ordinary block of an ordinary storage unit of an ordinary client platform;
downloading a file description image comprising a file description from a server coupled to the ordinary client platform, wherein the file description comprises a position of a first model block in a model storage unit of a model client platform coupled to the server, wherein the first model block stores an incremental file and the ordinary client platform is to use the file description image to present an icon of the incremental file on a user interface of the ordinary client platform when the incremental file is not loaded on the ordinary client platform; and
downloading a model block bitmap from the server, wherein the model block bitmap indicates usage status of each model block of the model storage unit.

8. The method of claim 7, further comprising:
determining whether the incremental file is available from the server based upon the ordinary block bitmap and the model block bitmap;
downloading the incremental file from the server;
storing the incremental file onto a first ordinary block of the ordinary storage unit corresponding to the position of the first model block in the model storage unit; and
updating the ordinary block bitmap to indicate that the first ordinary block is used.

9. The method of claim 8, further comprising retrieving the incremental file from a file image stored in the server based on the position of the first model block, wherein the file image links the incremental file with the position of the first model block.

10. The method of claim 8, wherein the file description image further comprises a position of a second model block in the model storage unit, wherein the second model block stores the file description.

11. The method of claim 10, further comprising:
storing the file description on a second ordinary block of the ordinary storage unit corresponding to the position of the second model block; and updating the ordinary block bitmap to indicate that the second ordinary block is used.

12. The method of claim 8, further comprising:
downloading a base file image from the server, the base file image comprising a base file and a position of a third model block in the model storage unit, wherein the third model block stores the base file; and
storing the base file onto a third ordinary block of the ordinary storage unit corresponding to the position of the third model block.

13. The method of claim 12, further comprising:
storing a new file onto a fourth ordinary block of the ordinary storage unit;
recording mapping information to map the fourth ordinary block with the third ordinary block, if the new file is an updated version of the base file.

14. A non-transitory machine-readable storage medium comprising a plurality of instructions which when executed result in a client platform:
storing an incremental file on a first block of a storage unit of the client platform;
rebooting the client platform;
generating a file image comprising the incremental file and a file description image comprising a file description for the incremental file, wherein the file description comprises a position of the first block in the storage unit;
generating a block bitmap to indicate usage status of each block of the storage unit; and
uploading the file image, the file description image and the block bitmap to a server coupled to the client platform, wherein the file description image is usable by an ordinary client platform coupled to the server to present an icon of the incremental file on a user interface of the ordinary client platform when the incremental file is not loaded on the ordinary client platform.

15. The non-transitory machine readable storage medium of claim 14, wherein the plurality of instructions further comprise:
deleting the incremental file from the storage unit of the client platform; and
logging out of the client platform.

16. A model client platform, comprising:
a model storage unit comprising a first model block to store an incremental file and a second model block to store a file description for the incremental file;
a model firmware component to generate a file image comprising the incremental file and a file description image comprising the file description, wherein the file description comprises a position of the first model block in the model storage unit, the model firmware component further to generate a model block bitmap to indicate usage status of each model block of the model storage unit; and
a model network interface to upload the file image, the file description image and the model block bitmap to a server, wherein the file description image is usable by an ordinary client platform coupled to the server to present an icon of the incremental file on a user interface of the ordinary client platform when the incremental file is not loaded on the ordinary client platform.

17. The model client platform of claim 16, wherein the model storage unit further comprises a third model block to store a base file.

18. The model client platform of claim 16, wherein the model firmware component further to generate another file image comprising a base file and a position of a third model block in the model storage unit; and the model network interface further to upload the another file image to the server.

19. The model client platform of claim 18, further comprising a driver to record mapping information to map the first model block storing the incremental file with the third model block storing the base file, if the incremental file is an updated version of the base file.

20. An ordinary client platform, comprising:
an ordinary storage unit comprising a plurality of ordinary blocks;
an ordinary network interface to download a file description image comprising a file description from a server, wherein the file description comprises a position of a first model block in a model storage unit of a model client platform, wherein the first model block stores the incremental file, wherein the file description image is usable by the ordinary client platform to present an icon of the incremental file on a user interface of the ordinary client platform when the incremental file is not loaded on the ordinary client platform, the ordinary network interface further to download a model block bitmap from the server, wherein the model block bitmap indicates usage status of each model block of the model storage unit; and
an ordinary firmware component to generate an ordinary block bitmap indicating usage status of the ordinary blocks.

21. The ordinary client platform of claim 20, further comprising a first driver to:
determine whether the incremental file is available from the server based on the ordinary block bitmap and the model block bitmap;
download the incremental file from the server;
store the incremental file onto a first ordinary block of the plurality of ordinary blocks corresponding to the position of the first model block; and
update the ordinary block bitmap to indicate the first ordinary block is used.

22. The ordinary client platform of claim 20, wherein the file description image further comprises a position of a second model block in the model storage unit, the second model block storing the file description; and the ordinary storage unit further stores the file description onto a second ordinary block of the plurality of ordinary blocks corresponding to the position of the second model block.

23. The ordinary client platform of claim 20, further comprising a second driver to:
receive a base file image from the server, the base file image comprising a base file and a position of a third model block in the model storage unit, wherein the third model block stores the base file; and
store the base file onto a third ordinary block of the plurality of ordinary blocks corresponding to the position of the third model block.

24. The ordinary client platform of claim 23, further comprising a second driver to:
store a new file onto a fourth ordinary block of the plurality of ordinary blocks; and
record mapping information to map the fourth ordinary block with the third ordinary block, if the new file is an updated version of the base file.

* * * * *